United States Patent
Derk, Jr. et al.

(10) Patent No.: US 9,970,234 B2
(45) Date of Patent: *May 15, 2018

(54) AUTOMATIC TORQUE CALIBRATION FOR ROLLER SHADES

(71) Applicant: Crestron Electronics, Inc., Rockleigh, NJ (US)

(72) Inventors: Charles R. Derk, Jr., Park Ridge, NJ (US); Benjamin Slivka, Hillsdale, NJ (US); Luis Rivera, Dumont, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 4 days.

This patent is subject to a terminal disclaimer.

(21) Appl. No.: 15/363,405

(22) Filed: Nov. 29, 2016

(65) Prior Publication Data

US 2017/0074038 A1    Mar. 16, 2017

Related U.S. Application Data

(63) Continuation of application No. 14/242,175, filed on Apr. 1, 2014, now Pat. No. 9,534,442.

(51) Int. Cl.
*E06B 9/72* (2006.01)
*E06B 9/50* (2006.01)
*E06B 9/68* (2006.01)

(52) U.S. Cl.
CPC .......... *E06B 9/72* (2013.01); *E06B 9/50* (2013.01); *E06B 2009/6809* (2013.01); *E06B 2009/6854* (2013.01)

(58) Field of Classification Search
CPC .......... E06B 9/72; E06B 2009/6854; E06B 2009/6809; H02P 3/08; H02P 6/24; H02P 29/0005; H02P 2205/05
See application file for complete search history.

(56) References Cited

U.S. PATENT DOCUMENTS 9,534,442 B2 *   1/2017   Derk, Jr. .............. E06B 9/50

* cited by examiner

*Primary Examiner* — Blair M Johnson
(74) *Attorney, Agent, or Firm* — Crestron Electronics, Inc

(57) ABSTRACT

A motorized roller shade that detects obstacles in its travel that create excess torque by sensing the current draw from a motor and method by which the motor can calibrate itself to detect excess torque. During the roller shade's travel, it will record the instantaneous torque being generated at various points. For example, it will store the greatest value in the shade motor's non-volatile memory as the normal operating torque.

20 Claims, 3 Drawing Sheets

AUTOMATIC TORQUE CALIBRATION FOR ROLLER SHADES

CROSS-REFERENCE TO RELATED APPLICATIONS

This application is a continuation of U.S. application Ser. No. 14/242,175, filed on Apr. 1, 2014, the entire contents of which are expressly incorporated herein by reference.

BACKGROUND OF THE INVENTION

Technical Field

The present invention generally relates to a system and method for raising and lowering roller shades and more particularly to system and methods to mitigate component damage or user injury during use.

Background Art

One type of motorized window treatment is a motorized roller shade. A typical motorized roller shade includes a flexible shade fabric wound onto an elongated roller tube. The roller tube is rotatably supported so that a lower end of the flexible shade fabric can be raised (i.e., wound) or lowered (i.e., unwound) by rotating the roller tube. The roller tube is rotated by a motorized drive system.

Motorized roller shades can be automated to automatically raise and lower. Unlike manual shades, where the user walks up to the window and opens or closes the shade using a cord or by pulling on the shade, motorized shades make it easy to open or close one or multiple shades with the touch of a button, or by programming them to automatically move at a specific time with no user interaction. In this regard, automation can be used to help minimize heat gain, prevent glare, or protect furnishings from harmful Ultra Violet rays.

Due to the automated nature of movement of motorized window treatments, a user may not realize if there is an obstruction. An obstruction may interfere with the shade and limit its movement. If a shade is lowered and encounters an obstruction, the shade fabric normally will bunch up. Damage normally does not occur to either, the motor nor an occupant of the room during lowering. However, when the shade is raised, the presence of an obstructing object may cause damage to the motor or brackets, for example, and poses an injury risk to the user. The amount damage, in some cases, may be directly related the amount of torque created.

SUMMARY OF THE INVENTION

It is to be understood that both the general and detailed descriptions that follow are exemplary and explanatory only and are not restrictive of the invention.

DISCLOSURE OF INVENTION

The present invention provides a method that detects obstacles that create excess torque by sensing the current draw from a motor. According to a first aspect, the present invention provides a method by which the motor can calibrate itself to detect excess torque. In one embodiment the motor can be calibrated to detect excess torque is to perform a step during the manufacturing process.

According to a second aspect, after the shade is completely manufactured it is finally inspected on a test rack. The shade operates from its lowest limit (fully closed or lowered) to its highest limit (fully open or raised). During the shade's travel, it will record the instantaneous torque being generated at various points. It will store the greatest value in the shade motor's non-volatile memory (NVRAM). This will be considered the normal operating torque.

There are good reasons not to set the greatest value at the factory. First, it does not represent the final installation of the shade. There are a number of things that can change the amount of torque required based on the installation. For example, adding side channels could add friction to the shade, resulting in more torque required to raise it. Mechanical wear over time may vary among shades. Moreover, this approach only takes into consideration fully assembled shades. If we were to send a replacement motor out to be swapped in the field, the normal operating torque value would be invalid because we cannot possibly test the motor in the same exact shade as the customer already has in the field.

According to a third aspect, during normal operation of the shade, any time the shade is sent from its lowest limit to highest limit uninterrupted, the normal operating torque is re-evaluated. This new normal operating torque is compared against the previous value that was stored in NVRAM. If the current torque being generated exceeds a predetermined factor of the normal operating torque, it is presumed that the shade has become obstructed. In this case, the motor will stop moving and reverse direction a predetermine amount to remove any built up tension in the shade (e.g., One-half of a revolution.)

On the other hand, if the torque being generated is less than a predetermined factor of the normal operating torque, then we can assume that this value can be used for the new normal operating torque. The value currently stored in NVRAM is replaced by this new value.

The present invention seeks to overcome or at least ameliorate one or more of several problems, including but not limited to, minimizing damage to a component or injury to a user in the operating roller shades.

BRIEF DESCRIPTION OF DRAWINGS

The accompanying figures further illustrate the present invention. The components in the drawings are not necessarily drawn to scale, emphasis instead being placed upon clearly illustrating the principles of the present invention. In the drawings, like reference numerals designate corresponding parts throughout the several views.

Figure 1:
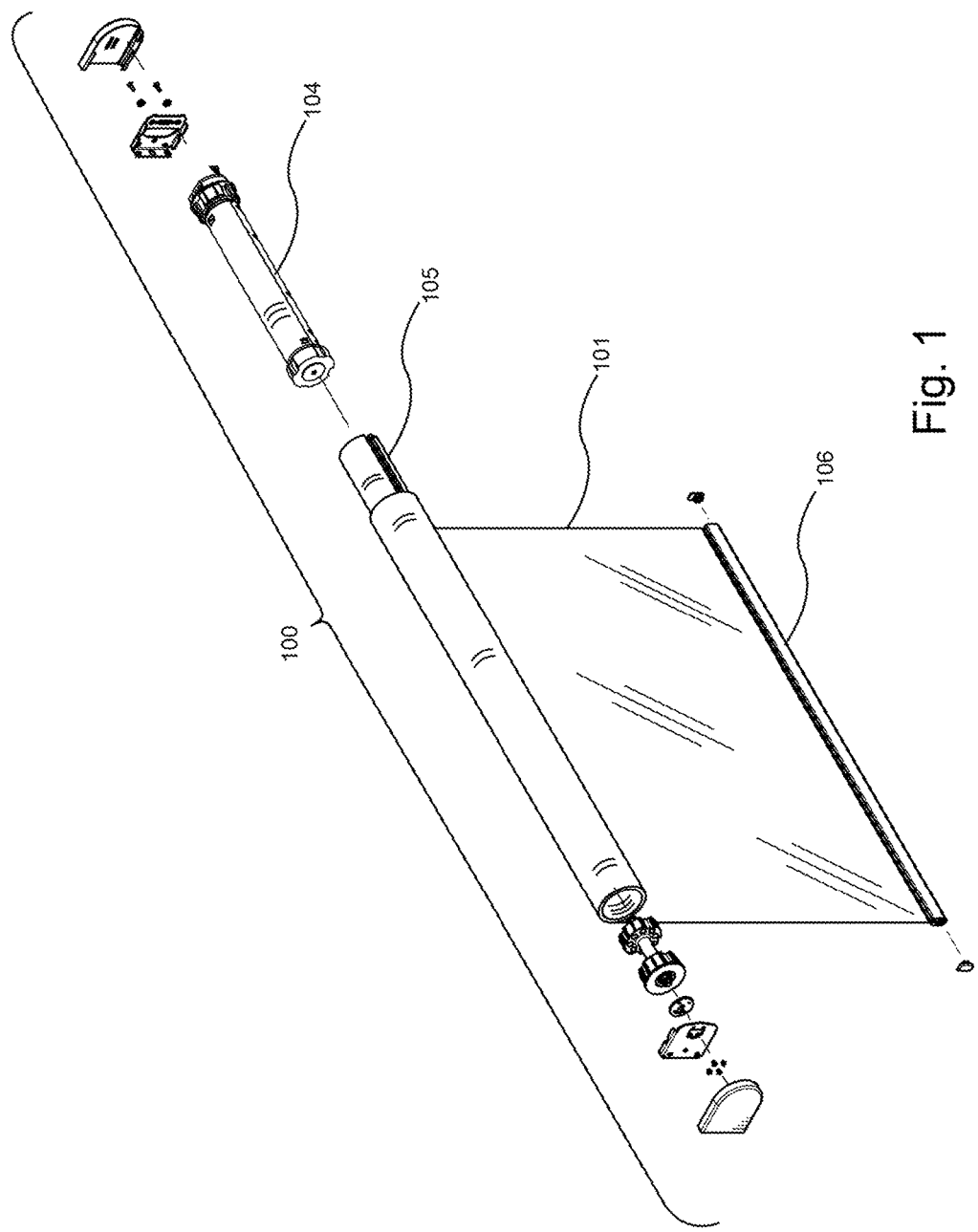

Brief Description of the Several Views of the Drawing

FIG. 1 is an exploded perspective view of an exemplary motorized roller shade according to an embodiment or the present invention.

Figure 2:
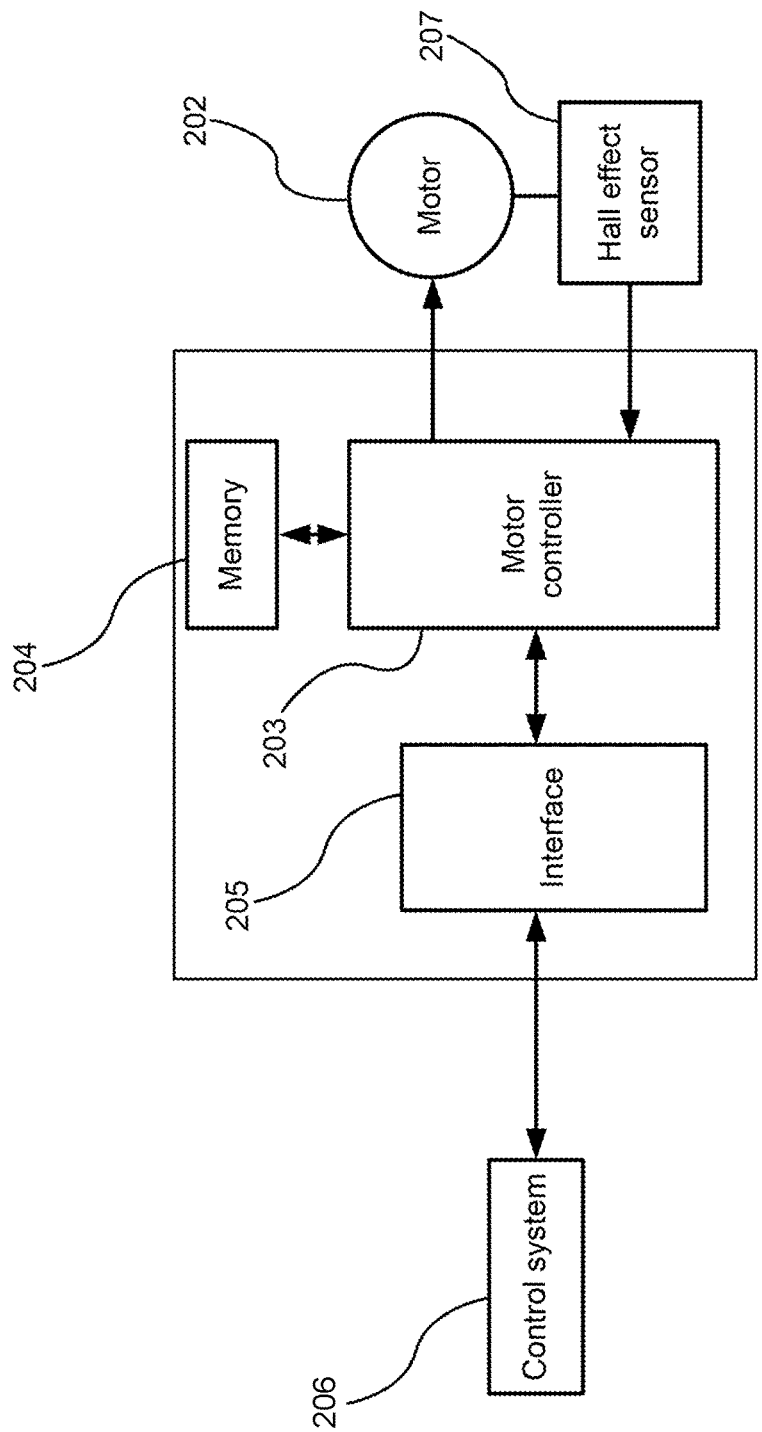

FIG. 2 shows a partial block diagram of an exemplary controller for the system of FIG. 1.

Figure 3:
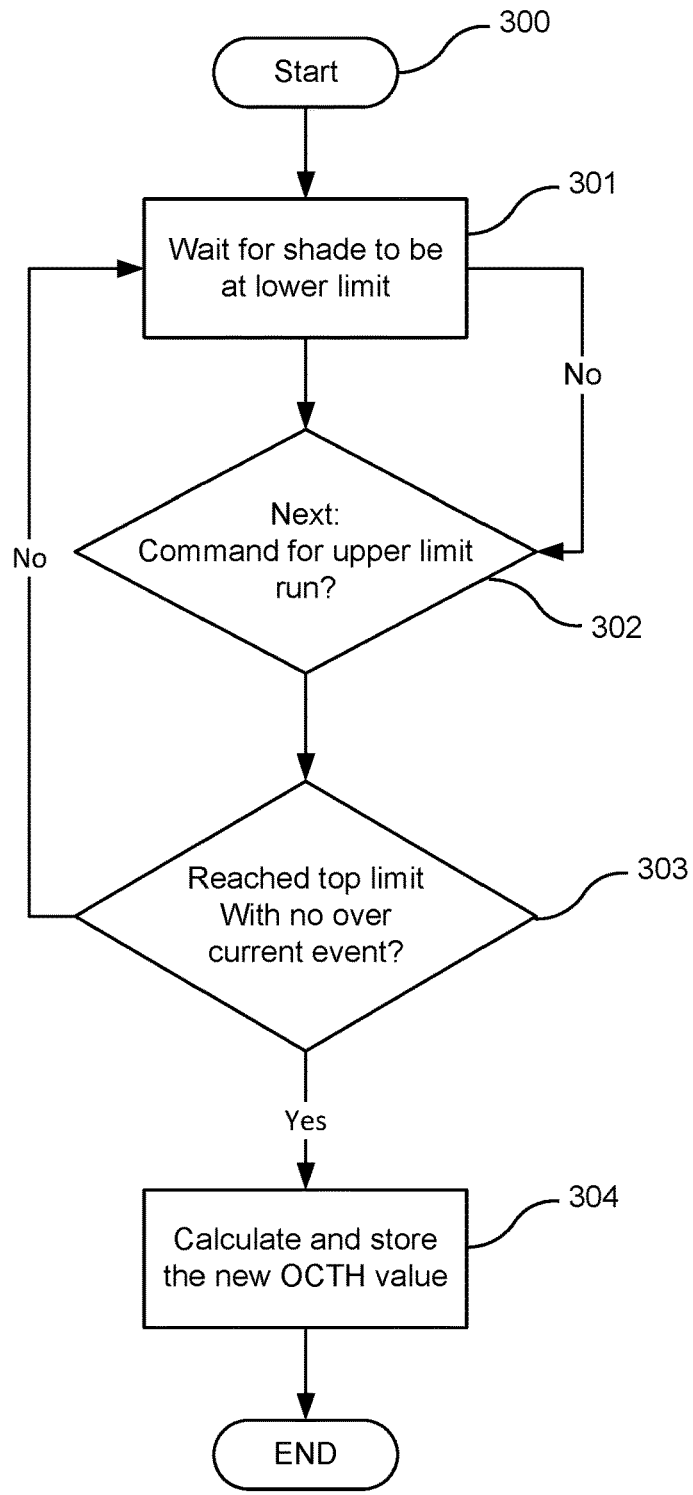

FIG. 3 shows the steps of an illustrative method of OCTH auto calibration using the system of FIG. 1.

DETAILED DESCRIPTION OF THE INVENTION

The present invention is generally implemented as part of a countermeasures system suitable for use in protecting commercial airliners from man portable missiles. Hence, an illustrative countermeasures system and its operation will be described initially.

List of Reference Numbers for the Major Elements in the Drawing

The following is a list of the major elements in the drawings in numerical order.

100 Motorized Roller Shade Device
101 Roller Shade Fabric
104 Drive Unit
105 Spline Roller
106 Exposed Hem Bar
202 Shade Motor
203 Motor Controller
204 NVRAM
205 Interface
206 Control System
207 Hall Effect Sensor
300 OCTH auto calibration method
301 Wait for lower limit step
302 Wait for upper limit command
303 Reach top limit success
304 Store the new OCTH value
305 Discard data from run Mode(s) for Carrying out the Invention The preferred embodiment of the present invention is described herein in the context of roller shades, but is not limited thereto, except as may be set forth expressly in the appended claims.

Disclosed are a system and a method for calibrating and controlling movement of a roller shade according to a detected load that is measured during normal operation. During a roller shade's travel, the instantaneous torque being generated at various points is determined. In one embodiment, the greatest value is stored in a non-volatile memory (NVRAM) of shade motor. Generally, the stored value can be considered the normal operating torque. The store value is periodically updated to compensate for any external factors. External factors may include: temperature, humidity, grease viscosity changes, and/or mechanical component wearing.

Initially, the shade is programmed to have a default OCTH value of zero. With an OCTH value of zero movement will not be interrupted in response to a sensed value of current. Put differently, any driver circuit overload protection would come from, for example, some other hardware protection mechanism engineered into the product.

Referring to FIG. 1, motorized roller shade device 100 may include a roller shade fabric 101, drive unit 104, a spline roller 105, and an exposed hem bar 106.

Referring to FIG. 2, shown is an exemplary controller, according to one embodiment. The controller may include a shade motor 202, a motor controller 203, an interface 205, a control system 206, and a Hall Effect sensor 207. The controller may further include a nonvolatile (NVRAM) memory 204 for storing OCTH values. The control system 206 can be connected via a wired connection using a protocol such as Ethernet, or communicate via wireless communication using IR, or RF circuitry.

Referring now to FIG. 3, shown is an exemplary dynamic OCTH calibration method 300. This method can be used for different shaped and sized shades 101. At step 301, the Motorized Roller Shade Device waits for the roller shade fabric 101 to be at the lowest limit (fully closed or lowered). When the roller shade fabric 101 is at the lowest limit, Motorized Roller Shade Device waits for a command to go to the upper limit, step 302, in which the OCTH auto calibration data capture will begin.

While rising towards the upper limit, if there is no over current event and the shade effectively reaches the top limit (step 303), the data will be valid, and the OCTH auto calibration algorithm will proceed to calculate and store the new OCTH value (step 304). If an over current event was detected, the normal handler of this event will be executed, and the auto calibration algorithm will not use the data from this run (step 303.)

In some embodiments, the lower limit can be changed. In these embodiments, adjustment to the OCTH may be needed, for example to compensate for the new amount of torque required to roll the additional fabric. Accordingly, whenever the lower limit is changed, the present OCTH may be invalidated to Zero and may be recalculated properly on the next bottom to top run.

The risk that the shade might encounter an unexpected obstacle and will not stop the motor until the amount of drawn current is high is very low in comparison to the normal expected every day operation of the shade.

The Auto Calibration of the OCTH may be calculated in various ways. New OCTH values can be determined, for example, as a sum of: a peak value; fixed minimum value; and a percentage of an average. Other ways may include accounting for the weight of unrolled roller shade fabric 101 at any given time.

List of Acronyms Used in the Detailed Description of the Invention

The following is a list of the acronyms used in the specification
NVRAM Non-Volatile Memory
OCTH Over-Current Threshold
IR Infrared
RF Radio Frequency
Alternate Embodiments Alternate embodiments may be devised without departing from the spirit or the scope of the invention.

What is claimed is:
1. A motorized roller shade comprising:
a roller;
a roller shade fabric attached to the roller;
a shade motor configured for raising or lowering the roller shade fabric;
a controller comprising a motor controller configured for controlling the shade motor and a memory configured for storing over-current threshold values, wherein the controller is configured for:
waiting for said roller shade fabric to be at a lowest limit;
after said roller shade fabric is at the lowest limit, waiting for a command to go to an upper limit;
capturing an over-current threshold auto calibration value by calculating a sum of a peak value, a fixed minimum value, and a percentage of an average value;
when there is (a) no over-current event and (b) the shade effectively reaches the upper limit, storing the over-current threshold auto calibration value; and
when an over-current event was detected, discarding the over-current threshold auto calibration value and directing the shade motor to stop.
2. The motorized roller shade of claim 1, wherein the controller is further configured for:
when there is (a) no over-current event and (b) the shade effectively reaches the upper limit, replacing a stored over-current threshold value with the over-current threshold auto calibration value.
3. The motorized roller shade of claim 1, wherein the controller is further configured for:

recording a current value generated during travel of the roller shade fabric; and comparing the recorded current value with a stored over-current threshold value to detect an over-current event.

4. The motorized roller shade of claim 1, wherein the controller is further configured for:

when an over-current event was detected, setting the over-current threshold value equal to zero.

5. The motorized roller shade of claim 1, wherein the controller is further configured for:

setting the over-current threshold value equal to zero whenever the lowest limit is changed.

6. The motorized roller shade of claim 1, wherein when the over-current event was detected, the controller is further configured for directing the motor to reverse direction by a predetermined number of revolutions.

7. The motorized roller shade of claim 6, wherein the shade motor is directed to reverse direction to remove built up tension in the roller shade fabric.

8. The motorized roller shade of claim 6, wherein the predetermined number of revolutions is at least one-half of a revolution.

9. The motorized roller shade of claim 1 further comprising a Hall Effect sensor configured for sensing current values.

10. A motorized roller shade comprising:

a roller;

a roller shade fabric attached to the roller;

a motor configured for raising or lowering the roller shade fabric;

a controller comprising a motor controller configured for controlling the motor and a memory configured for storing over-current threshold auto calibration values, wherein the controller is configured for determining an over-current threshold auto calibration value by:

operating the roller shade fabric from a lowest limit to a highest limit;

recording a plurality of current values;

determining an over-current threshold auto calibration value by calculating a sum of a peak value, a fixed minimum value, and a percentage of an average value; and storing the over-current threshold auto calibration value;

wherein the controller uses the over-current threshold auto calibration value during normal operation to detect an over-current event and stop the motor.

11. The motorized roller shade of claim 10, wherein when the over-current event is detected, the controller is further configured for directing the motor to reverse direction by a predetermined number of revolutions.

12. The motorized roller shade of claim 11, wherein the predetermined number of revolutions is at least one-half of a revolution.

13. The motorized roller shade of claim 11, wherein the motor is directed to reverse direction to remove built up tension in the roller shade fabric.

14. The motorized roller shade of claim 10, wherein the controller is further configured for:

when there is (a) no over-current event and (b) the shade effectively reaches the highest limit, storing the over-current threshold auto calibration value; and when an over-current event was detected, discarding the over-current threshold auto calibration value and directing the shade motor to stop.

15. The motorized roller shade of claim 10, wherein during normal operation, when the roller shade fabric travels from the lowest limit to the highest limit without an over-current event, the controller is configured for:

determining a new over-current threshold auto calibration value; and replacing the stored over-current threshold auto calibration value with the new over-current threshold auto calibration value.

16. The motorized roller shade of claim 10, wherein the controller detects the over-current event by:

recording a current value generated during travel of the roller shade fabric;

comparing the recorded current value to the stored over-current threshold auto calibration value; and detecting an over-current event when the recorded current value exceeds the stored over-current threshold auto calibration value.

17. The motorized roller shade of claim 10, wherein when the lowest limit is changed, the controller is configured for setting the stored over-current threshold auto calibration value to zero.

18. The motorized roller shade of claim 10, wherein the controller records a plurality of current values by sensing currents drawn from the motor.

19. The motorized roller shade of claim 10 further comprising a Hall Effect sensor configured for sensing current values.

20. The motorized roller shade of claim 10, wherein the lowest limit comprises a fully closed or lowered position, and wherein the highest limit comprises fully opened or raised position.

* * * * *